United States Patent
Linhoff et al.

(10) Patent No.: US 11,273,812 B2
(45) Date of Patent: Mar. 15, 2022

(54) BRAKE SYSTEM AND METHOD FOR OPERATING A BRAKE SYSTEM

(71) Applicant: Continental Teves AG & Co. OHG, Frankfurt (DE)

(72) Inventors: Paul Linhoff, Neu-Anspach (DE); Marco Besier, Bad Schwalbach (DE); Stefan Drumm, Saulheim (DE); Andreas Heise, Erzhausen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 134 days.

(21) Appl. No.: 16/683,915

(22) Filed: Nov. 14, 2019

(65) Prior Publication Data
US 2020/0079335 A1 Mar. 12, 2020

Related U.S. Application Data

(63) Continuation of application No. PCT/EP2018/060397, filed on Apr. 24, 2018.

(30) Foreign Application Priority Data

May 16, 2017 (DE) ...................... 10 2017 208 178.3

(51) Int. Cl.
*B60T 13/74* (2006.01)
*B60T 8/40* (2006.01)
(Continued)

(52) U.S. Cl.
CPC .......... *B60T 8/4081* (2013.01); *B60T 13/686* (2013.01); *B60T 7/042* (2013.01); *B60T 13/662* (2013.01);
(Continued)

(58) Field of Classification Search
CPC .......... B60T 2270/40; B60T 2270/402; B60T 2270/404; B60T 2270/413; B60T 13/741; B60T 13/745
See application file for complete search history.

(56) References Cited

U.S. PATENT DOCUMENTS 7,121,633 B2 * 10/2006 Tachiiri .................. B60T 7/107
303/20
8,991,943 B2 * 3/2015 Baehrle-Miller ......... B60T 8/32
303/163
(Continued)

FOREIGN PATENT DOCUMENTS

CN 104640752 A 5/2015
CN 105026232 A 11/2015
(Continued)

OTHER PUBLICATIONS

Search Report dated Apr. 20, 2018 from corresponding German Patent Application No. DE 10 2017 208 178.3.
(Continued)

*Primary Examiner* — Bradley T King (57) ABSTRACT

Brake system of a motor vehicle having front wheels and rear wheels having a hydraulic service brake device. The system further includes an electrically actuatable pressure-providing device, wherein the pressure-providing device is connected to the first and second wheel brakes, comprising a parking brake device having electric-motor-actuatable wheel brakes at the rear wheels, and an electronic open-loop and closed-loop control unit, wherein in a hydraulic fallback operating mode of the brake system, in the case of a brake pedal actuation by a vehicle driver, only the first wheel brakes are connected to the master brake cylinder and supplied with pressure by the driver by the master brake
(Continued)

cylinder, while the rear wheels are braked by the electric-motor-actuatable wheel brakes.

7 Claims, 3 Drawing Sheets

(51) Int. Cl.
*B60T 13/68* (2006.01)
*B60T 7/04* (2006.01)
*B60T 13/66* (2006.01)

(52) U.S. Cl.
CPC ......... *B60T 13/745* (2013.01); *B60T 2270/82* (2013.01); *B60Y 2400/81* (2013.01)

(56) References Cited

U.S. PATENT DOCUMENTS

| | | | | |
|---|---|---|---|---|
| 2002/0117891 | A1* | 8/2002 | Harris | B60T 8/4081 |
| | | | | 303/20 |
| 2011/0248558 | A1* | 10/2011 | Vollert | B60T 1/10 |
| | | | | 303/3 |
| 2015/0224972 | A1 | 8/2015 | Feigel | |
| 2015/0266457 | A1* | 9/2015 | Johnson | B60T 13/662 |
| | | | | 303/15 |
| 2016/0009263 | A1 | 1/2016 | Feigel | |
| 2016/0272178 | A1 | 9/2016 | Feigel | |

FOREIGN PATENT DOCUMENTS

| | | |
|---|---|---|
| CN | 105764759 A | 7/2016 |
| DE | 102008017480 A1 | 10/2008 |
| DE | 102013224870 A1 | 9/2014 |
| DE | 102014225962 A1 | 6/2016 |
| DE | 102015219001 A1 | 4/2017 |
| WO | 00/68053 A1 | 11/2000 |

OTHER PUBLICATIONS

International Search Report and Written Opinion dated Aug. 1, 2018 from corresponding International Patent Application No. PCT/EP2018/060397.

Chinese Office Action dated Apr. 29, 2021 for the counterpart Chinese Patent Application No. 201880032201.6.

\* cited by examiner

BRAKE SYSTEM AND METHOD FOR OPERATING A BRAKE SYSTEM

CROSS REFERENCE TO RELATED APPLICATIONS

This application is the U.S. national phase application of PCT International Application No. PCT/EP2018/060397, filed Apr. 24, 2018, which claims priority to German Patent Application No. DE 10 2017 208 178.3, filed May 16, 2017, wherein the contents of such applications are incorporated herein by reference.

TECHNICAL FIELD

A brake system and method for operating a brake system.

TECHNICAL BACKGROUND

DE 10 2013 224 870 A1 relates to a "brake-by-wire" brake assembly for motor vehicles which comprises a tandem master brake cylinder which can be actuated by means of a brake pedal and the two pressure spaces of which are in each case connected, separably by means of an electrically actuatable isolating valve, to a brake circuit with two wheel brakes, an activatable and deactivatable simulation device which is hydraulically connected to the master brake cylinder, and an electrically controllable pressure-providing device which is formed by a cylinder-piston arrangement with a hydraulic pressure space, the piston of which is displaceable by an electromechanical actuator. The brake system furthermore comprises electrically actuatable parking brake actuators, which are arranged at the wheel brakes of the rear wheels and by means of which assistance for a service braking operation can be carried out in an emergency. In the hydraulic fallback operating mode of the brake system, the hydraulically actuatable wheel brakes at both axles are supplied with the pressure of the master brake cylinder. By virtue of the relatively high total pressure medium volume capacity of the wheel brakes, this has the effect of a relatively long brake pedal travel.

In principle, it should be noted that there may only be a hydraulic/mechanical fallback level available to the driver in a "brake-by-wire" brake system after the failure of the "brake-by-wire" operating mode. In terms of the effect, this means that only the force introduced by the driver's foot is available to apply the hydraulic wheel brakes. Generally, the force of the driver's foot is considered to be limited to 500 Newtons. The deceleration that can be achieved by this means is significantly below the full deceleration on a dry road, depending on the vehicle weight and embodiment of the hydraulic friction brakes and the ratio of the effective radius of the brake to the rolling radius of the wheels. Heavy vehicles (e.g. SUVs) with large wheels are at a particular disadvantage. In order to achieve a maximum possible deceleration with the available force of the driver's foot, the selected design of the master brake cylinder diameter furthermore tends to be small. Although this has the effect of a relatively high pressure, there is the disadvantage of a greatly extended brake pedal travel.

SUMMARY

A brake system and a method for operating a brake system which achieve a higher braking deceleration with comfortable brake pedal travels.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

In a hydraulic fallback operating mode of the brake system, in the case of a brake pedal actuation by a vehicle driver, only the hydraulically actuatable wheel brakes at the front wheels are connected to the master brake cylinder and are supplied with pressure by the driver by means of the master brake cylinder, while the rear wheels are braked exclusively by means of the electric-motor-actuatable wheel brakes.

The embodiments offer the advantage of full exploitation of the deceleration potential at the rear axle without using the energy of the driver's foot. The energy of the driver's foot is concentrated on the braking effect at the front axle and thus a higher deceleration is achieved overall.

The hydraulic service brake device is embodied in such a way that the master brake cylinder is connected exclusively to the hydraulically actuatable first wheel brakes at the front wheels in the deenergized state of the hydraulic service brake device.

Alternatively, the hydraulic service brake device is embodied in such a way that the master brake cylinder is connected to the hydraulically actuatable first wheel brakes at the front wheels and to the hydraulically actuatable second wheel brakes at the rear wheels in the deenergized state of the hydraulic service brake device.

The electronic open-loop and closed-loop control unit comprises at least one first electric and/or electronic means for controlling the electrically actuatable components of the hydraulic service brake device and at least one second electric and/or electronic means, embodied separately from the first means, for controlling the electric-motor-actuatable wheel brakes. In the event of a failure of the first means for controlling the hydraulic service brake device, the rear wheels can thus nevertheless be braked by means of the electric-motor-actuatable wheel brakes in the hydraulic fallback operating mode. This increases the availability for braking with a high deceleration.

Signals from wheel speed sensors arranged at the front and rear wheels are preferably fed to the second means. The necessary data for wheel slip control at the rear wheels by means of the parking brake device are thus available in the second means.

The second electric and/or electronic means is preferably designed for carrying out wheel slip control at the rear wheels by means of the electric-motor-actuatable wheel brakes. Thus, wheel slip control can be carried out at the rear wheels by the electric-motor-actuatable wheel brakes by means of the second means, even in the event of failure of the first means.

The wheel speed sensor signals are preferably transferred from the second means to the first means.

According to one or more embodiments, the first means and the second means are supplied with electric energy by a first electric energy source.

In one or more embodiments, the first means is supplied with electric energy by a first electric energy source, and the second means is supplied with electric energy by a second, independent electric energy source.

The second means is additionally designed to control the inlet valves of the second wheel brakes. This is advantageous particularly in the case of a hydraulic service brake device in which the master brake cylinder is connected to the hydraulically actuatable first and second wheel brakes in the deenergized state of the hydraulic service brake device. It is thus possible, in the deenergized state of the hydraulic service brake device, for the inlet valves of the second wheel brakes to be closed by means of the second means so that the second wheel brakes are not connected to the master brake cylinder in the hydraulic fallback operating mode.

A method for operating a "brake-by-wire" brake system having a hydraulic service brake device for front and rear wheels and a parking brake device having electric-motor-actuatable wheel brakes at the rear wheels. Here, in a hydraulic fallback operating mode of the brake system, in the case of a brake pedal actuation by a vehicle driver, only the hydraulic front wheel brakes are connected to the master brake cylinder and are supplied with pressure by the driver by means of the master brake cylinder, while the rear wheels are braked exclusively by means of the electric-motor-actuatable wheel brakes.

In one or more embodiments, if, in the hydraulic fallback operating mode, the inlet valves of the hydraulic rear wheel brakes are closed, with the result that only the hydraulic front wheel brakes are connected to the master brake cylinder and are supplied with pressure by the vehicle driver by means of the master brake cylinder. In the hydraulic fallback operating mode, wheel slip control is preferably carried out at the rear wheels by means of the electric-motor-actuatable wheel brakes.

The brake system preferably comprises an electrically actuatable, advantageously normally closed, simulator valve by means of which the effect of the simulation device can be activated and deactivated. As a particular preference, the simulator valve is arranged between the master brake cylinder and the simulation device.

The pressure-providing device is connected to the first and to the second wheel brakes via a respective electrically actuatable, advantageously normally closed, activation valve.

The hydraulically actuatable (second) wheel brake of a rear wheel and the electric-motor-actuatable wheel brake of the same rear wheel are preferably embodied as a combined wheel brake in the sense that a displaceable brake piston of the combined wheel brake can be actuated by means of an electric motor of the parking brake device or hydraulically by means of the service brake device.

As an alternative preference, the hydraulically actuatable (second) wheel brake and the electric-motor-actuatable wheel brake of a rear wheel are embodied separately.

Figure 1:
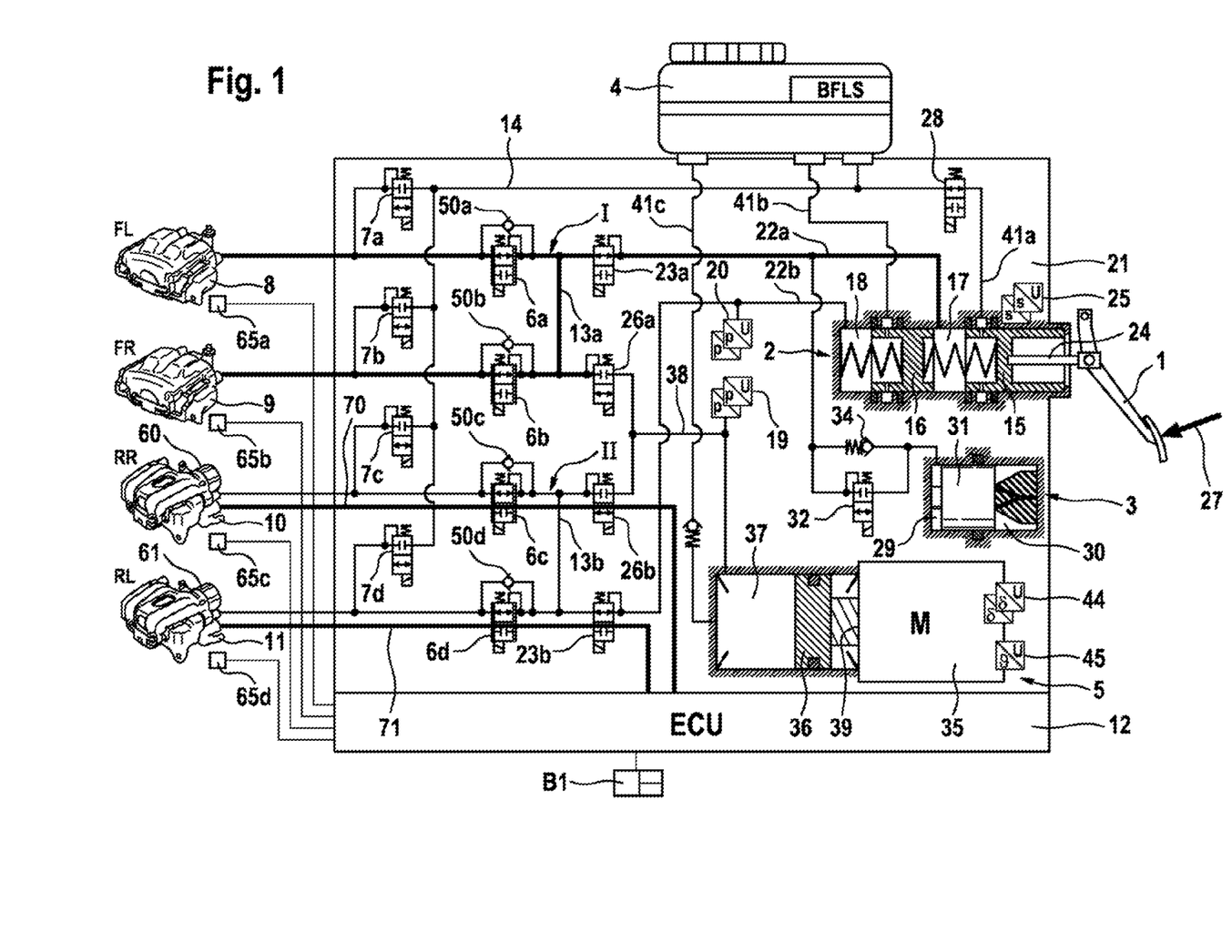
FIG. 1 shows a first exemplary embodiment of a brake system for carrying out a method.

FIG. 1 illustrates an exemplary embodiment of a brake system for a motor vehicle having two front wheels (front left: FL, front right: FR) and two rear wheels (rear right: RR, rear left: RL) (not shown specifically). The brake system comprises a hydraulic service brake device having hydraulically actuatable wheel brakes 8, 9 at the front wheels FL, FR and hydraulically actuatable wheel brakes 10, 11 at the rear wheels RR, RL, a parking brake device (EPB: electric parking brake) having electric-motor-actuatable wheel brakes 60, 61 at the rear wheels RR, RL and an electronic open-loop and closed-loop control unit 12.

First of all, the hydraulic service brake device will be explained in greater detail. It comprises a master brake cylinder 2, which can be actuated by means of an actuation or brake pedal 1, a simulation device 3 cooperating with the master brake cylinder 2, a pressure medium reservoir 4 assigned to the master brake cylinder 2 and subject to atmospheric pressure, an electrically controllable pressure-providing device 5, which is formed by a cylinder-piston arrangement with a hydraulic pressure chamber 37, the piston 36 of which can be displaced by an electromechanical actuator, an electrically controllable pressure modulation device for setting wheel-specific brake pressures, and a hydraulically actuatable wheel brake 8, 9, 10, 11 at each wheel of the vehicle.

The hydraulically actuatable wheel brakes 8, 9 of the front wheels FL, FR are also referred to below as first wheel brakes, and the hydraulically actuatable wheel brakes 10, 11 of the rear wheels are also referred to as second wheel brakes. The first wheel brakes 8, 9 are assigned to a first (hydraulic) brake circuit I, and the second wheel brakes 10, 11 are assigned to a second (hydraulic) brake circuit II.

By way of example, the pressure modulation device (not designated specifically) comprises, for each hydraulically actuatable wheel brake 8, 9, 10, 11, an inlet valve 6a-6d and an outlet valve 7a-7d, which are hydraulically interconnected in pairs by central ports and are connected to the respective wheel brake 8, 9, 10, 11. The outlet ports of the outlet valves 7a-7d are connected to the pressure medium reservoir 4 via a return line 14. The inlet ports of the inlet valves 6a, 6b or 6c, 6d of a brake circuit I or II are connected to one another by means of a brake circuit supply line 13a or 13b respectively. A check valve 50a-50d opening in the direction of the brake circuit supply lines 13a, 13b is connected in parallel with each of the inlet valves 6a-6d.

The master brake cylinder 2 has, in a housing 21, two pistons 15, 16 which are arranged in series and which delimit hydraulic pressure spaces 17, 18. On the one hand, the pressure spaces 17, 18 are connected to the pressure medium reservoir tank 4 via radial bores formed in the pistons 15, 16 and corresponding pressure equalization lines 41a, 41b, wherein the connections can be shut off by a relative movement of the pistons 17, 18 in the housing 21. A normally open (NO) diagnostic valve 28 is arranged in the pressure equalization line 41a between the pressure space 17 and the pressure medium reservoir 4. The pressure spaces 17, 18 contain restoring springs (not designated specifically), which position the pistons 15, 16 in a starting position when the master brake cylinder 2 is not actuated. A piston rod 24 couples the pivoting movement of the brake pedal 1 resulting from a pedal actuation 27 to the translational movement of the first (master brake cylinder) piston 15, the actuation travel of which is detected by a travel sensor 25, which is preferably of redundant design. In this way, the corresponding piston travel signal is a measure of the brake pedal actuation angle. It represents a braking request by the vehicle driver.

On the other hand, each pressure space 17 or 18 is connected by means of a hydraulic line section 22a or 22b to one of the brake circuit supply lines 13a or 13b, wherein the respective isolating valve 23a or 23b is arranged between the pressure space 17 or 18 and the brake circuit supply line 13a or 13b. According to the example, the first pressure space 17 of the master brake cylinder 2 is assigned to the front axle brake circuit I and connected to brake circuit supply line 13a, and the second pressure space 18 is assigned to the rear axle brake circuit II and connected to brake circuit supply line 13b. The isolating valve 23a or 23b is designed as an electrically actuatable, preferably normally open (NO), 2/2-way valve. By means of the isolating valves 23a, 23b, the hydraulic connection between the pressure spaces 17, 18 of the master brake cylinder 2 and the brake circuit supply lines 13a, 13b can be shut off. This is the situation in a "brake-by-wire" operating mode of the brake system, for example.

A pressure sensor 20, connected to the line section 22b by way of example, detects the pressure in the master brake cylinder 2. The simulation device 3 is hydraulically couplable to the master brake cylinder 2 and, in the example, is composed substantially of a simulator chamber 29, a simulator spring chamber 30 and a simulator piston 31 which separates the two chambers 29, 30 from one another. The simulator piston 31 is supported on the housing 21 by an elastic element (for example a spring), which is arranged in the simulator spring chamber 30 and which is advantageously preloaded. The simulator chamber 29 is connectable to the first pressure space 17 of the master brake cylinder 2 by means of an electrically actuatable simulator valve 32. When a pedal force is input and simulator valve 32 is open, pressure medium flows from the master brake cylinder pressure space 17 into the simulator chamber 29. A check valve 34 arranged hydraulically antiparallel to the simulator valve 32 allows the pressure medium to flow back from the simulator chamber 29 to the master brake cylinder pressure space 17 largely unhindered, irrespective of the switching state of the simulator valve 32. Other embodiments and connections of the simulation device to the master brake cylinder 2 are conceivable.

The electrically controllable pressure-providing device 5 is designed as a hydraulic cylinder-piston arrangement or a single-circuit electrohydraulic linear actuator, whose piston 36, which delimits the pressure chamber 37, is actuatable by a schematically indicated electric motor 35 via a likewise schematically illustrated rotation/translation mechanism 39. A merely schematically indicated rotor position sensor which serves to detect the rotor position of the electric motor 35 is denoted by reference sign 44. In addition, a temperature sensor 45 may be used for sensing the temperature of the motor winding.

The actuator pressure generated by the effect of the force of the piston 36 on the pressure medium enclosed in the pressure chamber 37 is fed into the system pressure line 38 and detected by means of a pressure sensor 19, which is preferably of redundant design. The system pressure line 38 is connected to the brake circuit supply lines 13a, 13b, wherein a respective activation valve 26a or 26b is arranged between the pressure chamber 37 and the brake circuit supply line 13a or 13b. When the activation valves 26a, 26b are open, the pressure medium enters the wheel brakes 8, 9, 10, 11 for the actuation thereof. This is the situation in the "brake-by-wire" operating mode of the brake system, for example. Thus, when the activation valves 26a, 26b are open, during a normal braking operation in the "brake-by-wire" operating mode, a wheel brake pressure build-up and dissipation for all the wheel brakes 8, 9, 10, 11 can take place by means of forward and backward displacement of the piston 36.

Pressure chamber 37 is connected to the pressure medium reservoir 4 via a connecting line 41c, in which a check valve 52 opening in the flow direction toward the pressure-providing device 5 is arranged. Thus, additional pressure medium can be drawn into the pressure chamber 37 by retraction of the piston 36 while the activation valves 26a, 26b are closed.

The parking brake device comprises electric-motor-actuatable wheel brakes 60, 61 at the rear wheels RR, RL of the vehicle. These are provided in addition to the hydraulically actuatable wheel brakes 10, 11 of the rear wheels RR, RL. However, the electric-motor-actuatable wheel brakes 60, 61 and the hydraulically actuatable wheel brakes can be arranged or formed jointly in a single brake caliper, referred to as a combination caliper. Each of the wheel brakes 60, 61 is connected to the electronic open-loop and closed-loop control unit 12 by an electric signal line 70, 71, thus enabling the electric-motor-actuatable wheel brakes 60, 61 to be controlled and actuated by the open-loop and closed-loop control unit 12.

The electronic open-loop and closed-loop control unit 12 is also used to control the electrically actuatable components of the hydraulic service brake device, in particular the valves 6a-6d, 7a-7d, 23a, 23b, 26a, 26b, 28, 32 and the electric motor 35 of the pressure-providing device 5. The signals of the sensors 19, 20, 25 and 44 are likewise fed to the electronic open-loop and closed-loop control unit 12 and processed there. A wheel speed sensor 65a-65d is provided at each wheel FL, FR, RR, RL, and the wheel speed signals thereof are fed to or made available to the electronic open-loop and closed-loop control unit 12. The brake system is supplied with electric energy by an electric energy source B1, e.g. a battery or an onboard electrical system. As also illustrated in FIG. 1 (indicated by the thicker lines), in a hydraulic fallback operating mode of the brake system, only the first wheel brakes 8, 9 of the front wheels FL, FR are connected to the master brake cylinder 2 and supplied with pressure by the vehicle driver by means of the master brake cylinder 2 (by pedal actuation 27), while the rear wheels RR, RL are braked exclusively by means of the electric-motor-actuatable wheel brakes 60, 61.

Figure 2:
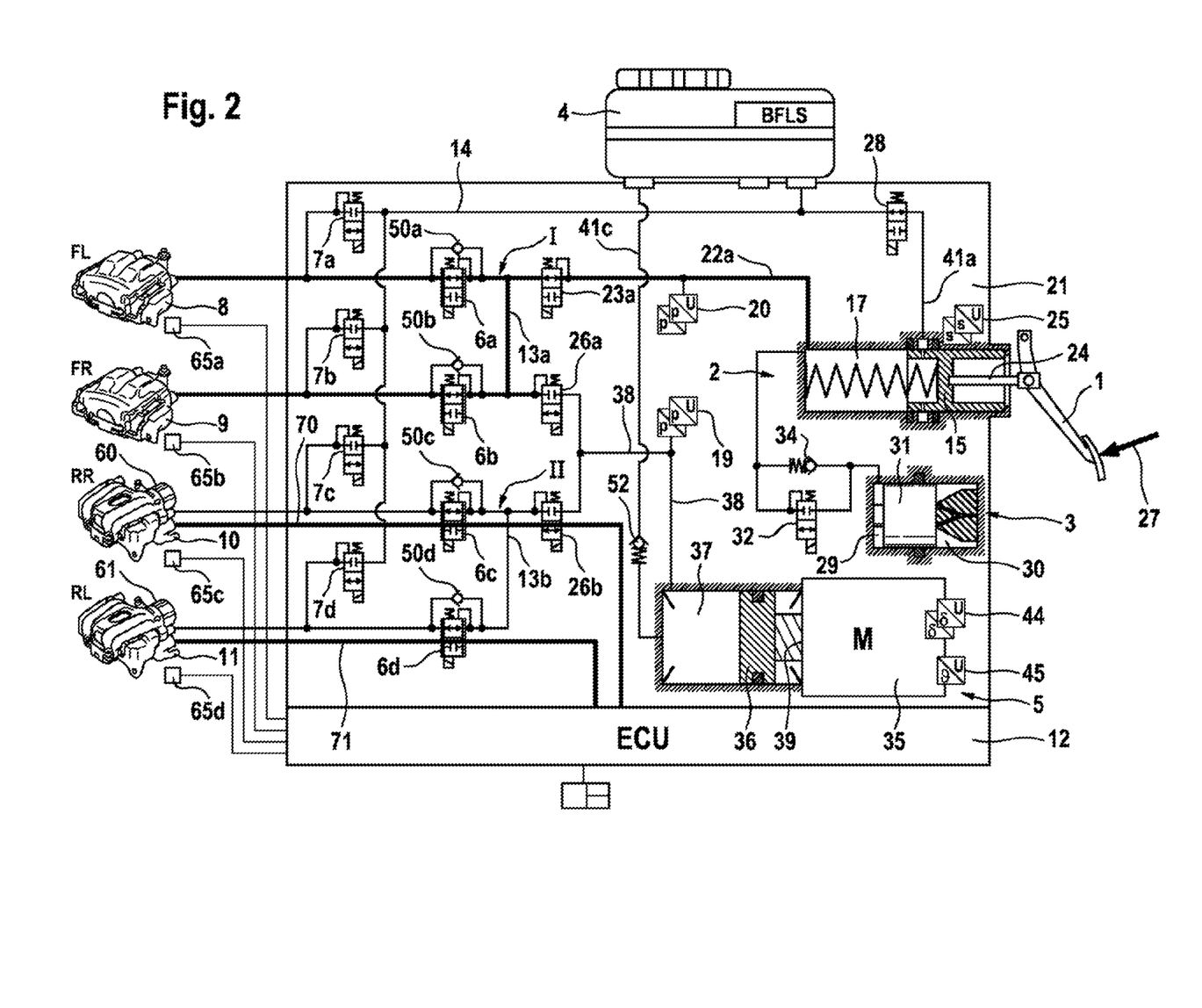
FIG. 2 shows a second exemplary embodiment of a brake system for carrying out a method.

FIG. 2 illustrates another exemplary embodiment of a brake system for a motor vehicle having two front wheels (front left: FL, front right: FR) and two rear wheels (rear right: RR, rear left: RL) (not shown specifically). The brake system comprises a hydraulic service brake device having hydraulically actuatable wheel brakes 8, 9 at the front wheels FL, FR and hydraulically actuatable wheel brakes 10, 11 at the rear wheels RR, RL, a parking brake device having electric-motor-actuatable wheel brakes 60, 61 at the rear wheels RR, RL and an electronic open-loop and closed-loop control unit 12.

In contrast to the exemplary embodiment in FIG. 1, the master brake cylinder 2 is of single-circuit configuration, with just one (first) piston 15 and just one (first) pressure space 17. Pressure space 17 or master brake cylinder 2 is connected to the brake circuit supply line 13a of the front axle brake circuit I by means of the hydraulic line section 22a, wherein the isolating valve 23a is arranged between the pressure space 17 and the brake circuit supply line 13a. According to the example, pressure sensor 20 is connected to the line section 22a.

A hydraulic connection of the pressure space 17 or master brake cylinder 2 to the rear wheel brakes 10, 11 (or the brake circuit supply line 13b) is possible only via the isolating valve 23a, activation valve 26a and activation valve 26b.

In the fallback operating mode, only the front wheel brakes 8, 9 are supplied with pressure medium from the master brake cylinder 2 by the driver (the pedal actuation 27). The rear wheels RR, RL are braked exclusively by means of the electric-motor-actuatable wheel brakes 60, 61. This is indicated in FIG. 2 by the thicker lines (hydraulic: lines 22a, 13a and to the wheel brakes 8, 9, electric: control lines 70, 71).

The brake system in FIG. 2 does not comprise a hydraulic line section 22b from the master brake cylinder 2 to the brake circuit supply line 13b of the rear axle brake circuit and, accordingly, does not comprise an isolating valve 23b like that in the brake system in FIG. 1 either.

Figure 3:
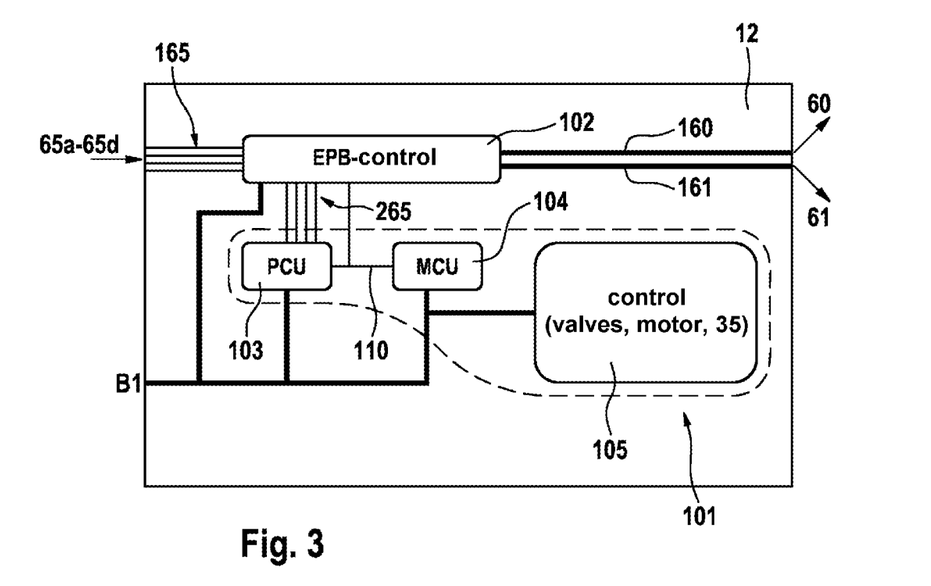
FIG. 3 shows a first exemplary embodiment of part of an electronic open-loop and closed-loop control unit for controlling a brake system.

FIG. 3 shows, in highly schematic form, a detail of a first electronic open-loop and closed-loop control unit 12 according to the example for controlling a brake.

The electronic open-loop and closed-loop control unit 12 comprises a first electric and/or electronic means 101 for controlling the electrically actuatable components of the hydraulic service brake device and a second electric and/or electronic means 102, embodied separately from the first means, for controlling the parking brake device, in particular the electric-motor-actuatable wheel brakes 60, 61.

According to the example, the first means 101 of the electronic open-loop and closed-loop control unit 12 comprises a power control unit 103 (PCU), a microcontroller 104 (MCU: microcontroller unit) and control electronics 105.

According to the example, control electronics 105 comprise electronics for controlling the valves of the hydraulic service brake device (e.g. the valves 6a-6d, 7a-7d, 23a, 23b, 26a, 26b, 28, 34). Moreover, the control electronics 105 comprise the electrical components for controlling the electric motor 35 of the pressure-providing device 5.

Figure 4:
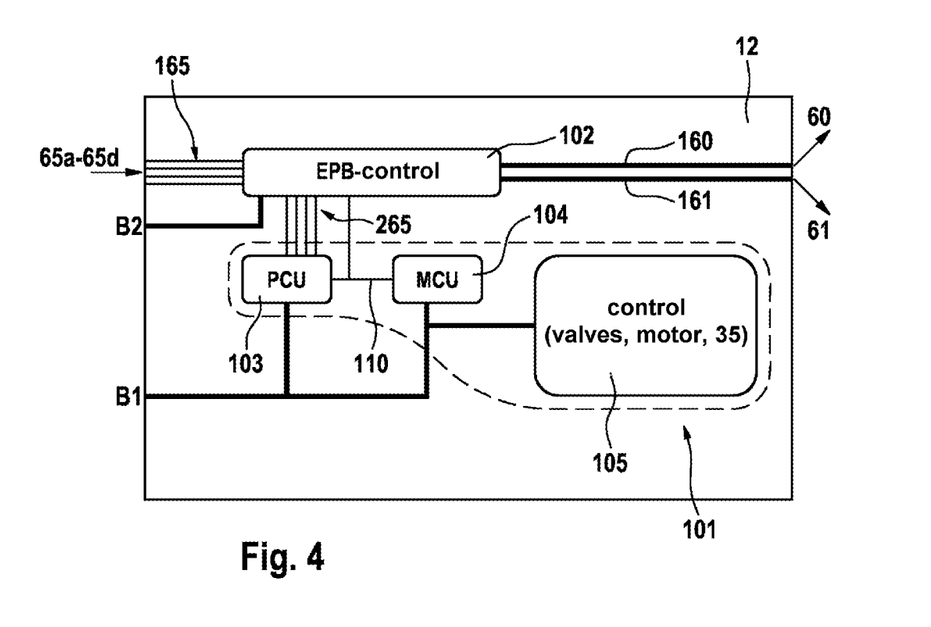
FIG. 4 shows a second exemplary embodiment of part of an electronic open-loop and closed-loop control unit for controlling a brake system.

The signals of the wheel speed sensors 65a-65d arranged at the front and rear wheels are fed to the second means 102 for the control of the parking brake device (indicated by the lines 165 in FIGS. 3 and 4).

For the control of the wheel brakes 60, 61, the second means 102 is connected to said brakes by control lines 160, 161.

The signals of the wheel speed sensors 65a-65d are transmitted by the second means 102 for the control of the parking brake device to power control unit 103 (indicated by the lines 265 in FIGS. 3 and 4).

It is advantageous if the second means 102 is additionally designed to control the inlet valves 6c, 6d of the second wheel brakes 10, 11 (corresponding control lines are not illustrated in FIGS. 3 and 4). Means 102 comprises power electronics for controlling these valves 6c, 6d, for example. This is advantageous especially for a brake system as in FIG. 1, in which the master brake cylinder 2 is connected to the first and second wheel brakes 8-11 in the deenergized state of the hydraulic service brake device.

The first means 101 and the second means 102 are supplied with electric energy by an electric energy source B1.

FIG. 4 shows, in highly schematic form, a detail of a second electronic open-loop and closed-loop control unit 12 according to the example for controlling a brake.

The electronic open-loop and closed-loop control unit 12 in FIG. 4 corresponds to a large extent to the electronic open-loop and closed-loop control unit 12 in FIG. 3.

Thus, the electronic open-loop and closed-loop control unit 12 comprises a first electric and/or electronic means 101 for controlling the electrically actuatable components of the hydraulic service brake device and a second electric and/or electronic means 102, embodied separately from the first means, for controlling the parking brake device, in particular the electric-motor-actuatable wheel brakes 60, 61. The signals of the wheel speed sensors 65a-65d arranged at the front and rear wheels are furthermore fed to the second means 102 for the control of the parking brake device (lines 165).

In contrast to FIG. 3, a first electric energy source B1 and a second electric energy source B2 independent of the first energy source B1 are provided in FIG. 4. In this case, the first means 101 is supplied with electric energy by the first energy source B1 and the second means 102 is supplied with electric energy by the second energy source B2. The additional, independent energy source B2 is therefore provided for the actuation of the parking brake device. Thus, braking can continue to be carried out by means of the parking brake device, by way of means 102, even if the first energy source B1 and hence the electric control of the hydraulic service brake device fail.

The system herein offers the advantage of improved functioning/implementation of the fallback level of a "brake-by-wire" brake system after an initial major electronic fault in the region of the electrically actuatable pressure-providing device 5 of the hydraulic service brake device, improving the braking effect and vehicle stability and avoiding braking processes with an unstable effect. For this purpose, the hydraulic wheel brakes 8, 9 are operated by the driver only at the front wheels FL, FR, and a corresponding braking effect is set at the rear wheels RR, RL with the aid of the parking brake device or the actuators (electric motors) of the electric-motor-actuatable wheel brakes 60, 61.

The braking torque at the rear axle (rear wheels RR, RL) is preferably set at a favorable ratio relative to the braking torque of the rear axle. This can be accomplished by wheel speed control or wheel slip control, for example.

In one illustrative embodiment (see FIG. 2, for example) of the brake system, the hydraulic circuit diagram is embodied in such a way that the driver can operate only the wheel brakes 8, 9 of the front axle by means of the master brake cylinder 2 (in the deenergized state of the hydraulic service brake device) after the failure of the by-wire braking function (i.e. in the hydraulic fallback operating mode of the brake system, e.g. in the case of failure of pressure generation by pressure-providing device 5). The electronic open-loop and closed-loop control unit 12 is embodied in such a way that some of the electronics, e.g. the second means 102, which can operate the EPB actuators (electric-motor wheel brakes 60, 61), remain available after the failure of the by-wire braking function.

The available part of the electronics (the second means 102) can preferably read in the signals of the wheel speed sensors 65a-65d and can preferably carry out wheel slip control of the rear axle wheels RR, RL in such a way that the EPB actuators are released and applied in a suitable manner.

In a further exemplary embodiment (see FIG. 1, for example) of the brake system, the hydraulic circuit diagram is embodied in such a way that the driver could in principle operate the wheel brakes 8-11 of the front axle and of the rear axle by means of the master brake cylinder 2 (in the deenergized state of the hydraulic service brake device) after the failure of the by-wire braking function (i.e. in the hydraulic fallback operating mode of the brake system). In the hydraulic fallback operating mode, however, the second wheel brakes 10, 11 (hydraulic wheel brakes 10, 11 of the rear wheels) are not connected to the master brake cylinder (2) and are supplied with pressure by the vehicle driver by means of the master brake cylinder (2).

The electronic open-loop and closed-loop control unit 12 is preferably then embodied in such a way that the inlet valves 6c, 6d of the rear wheels RR, RL can be actuated by the part of the electronics which can operate the EPB actuators (electric-motor wheel brakes 60, 61), e.g. by the second means.

Control is then carried out in the hydraulic fallback operating mode in such a way that the inlet valves 6c, 6d of the rear wheel brakes 10, 11 are closed in the case of a brake actuation 27 by the driver. The driver then operates only the hydraulic front wheel brakes 8, 9. The rear wheels RR, RL are braked exclusively by means of the electric-motor wheel brakes 60, 61.

This exemplary embodiment has the additional advantage that, in the case of a complete failure of the electric energy supply of the brake system, the vehicle can nevertheless be decelerated in a second hydraulic fallback operating mode with all the hydraulic wheel brakes 8-11. However, there is then the disadvantage of a longer pedal travel.

After a double fault or an existing dormant fault with the result that application of the front wheel brakes 8, 9 does not occur after driver brake actuation 27, the operating mode of the fallback level (actuation of the parking brake device) is preferably modified in such a way that the electric-motor-actuatable wheel brakes 60, 61 are actuated in a manner similar to the ADBF.

The invention claimed is:

1. A brake system of a motor vehicle having front wheels and rear wheels, the brake system comprising:
    a master brake cylinder comprising a first hydraulic pressure space connected to a pressure medium reservoir tank and a second hydraulic pressure space connected to the pressure medium reservoir tank;
    a first brake circuit supply line coupled to the first hydraulic pressure space;
    a second brake circuit supply line coupled to the second hydraulic pressure space;
    a first hydraulically actuatable wheel brake configured to brake a first front wheel of the front wheels, a second hydraulically actuatable wheel brake configured to brake a second front wheel of the front wheels, a third hydraulically actuatable wheel brake configured to brake a first rear wheel of the rear wheels, and a fourth hydraulically actuatable wheel brake configured to brake a second rear wheel of the rear wheels, wherein the first hydraulically actuatable wheel and the second hydraulically actuatable wheel brake are hydraulically coupled to the first hydraulic pressure space via the first brake circuit supply line, and wherein the third hydraulically actuatable wheel brake the fourth hydraulically actuatable wheel brake are hydraulically coupled to the second hydraulic pressure space via the second brake circuit supply line;
    an isolating valve disposed along the second brake circuit supply line between the second hydraulic pressure space and the third hydraulically actuatable wheel brake and the fourth hydraulically actuatable wheel brake, wherein the isolating valve comprises a normally open (NO) 2-2 way valve;
    a first electric-motor-actuatable wheel brake at the first rear wheel;
    a second electric-motor-actuatable wheel brake at the second rear wheel; and
    an electronic control unit configured to hydraulically decouple the third hydraulically actuatable wheel brake and the master brake cylinder and hydraulically decouple the fourth hydraulically actuatable wheel brake and the master brake cylinder by actuating the isolating valve, and control the first hydraulically actuatable wheel brake to brake the first front wheel, the second hydraulically actuatable wheel brake to brake the second front wheel, the first electric-motor-actuatable wheel brake to brake the first rear wheel hydraulically decoupled from the third hydraulically actuatable wheel brake, and the second electric-motor-actuatable wheel brake to brake the second rear wheel hydraulically decoupled from the fourth hydraulically actuatable wheel brake in a hydraulic fallback operating mode.

2. The brake system as claimed in claim 1, further comprising:
    a first electrically actuatable inlet valve disposed along the second brake circuit supply line coupled between the third hydraulically actuatable wheel brake and the isolating valve; and
    a second electrically actuatable inlet valve disposed along the second brake circuit supply line coupled between the fourth hydraulically actuatable wheel brake and the isolating valve,
    wherein the electronic control unit is configured to actuate the first electrically actuatable inlet valve to modulate pressure to the third hydraulically actuatable wheel brake and actuate the second electrically actuatable inlet valve to modulate pressure to the fourth hydraulically actuatable wheel brake.

3. The brake system as claimed in claim 2, further comprising:
    a pressure-providing device hydraulically coupled to the master brake cylinder,
    wherein the hydraulic fallback operating mode comprises a mode in which pressure provided to the master brake cylinder by the pressure-providing device fails.

4. The brake system as claimed in claim 2, wherein the electronic control unit comprises:
    a first electronic control unit configured to electrically control the first electrically actuatable inlet valve and the second electrically actuatable inlet valve; and
    a second electronic control unit configured to electrically control the first electric-motor-actuatable wheel brake and the second electric-motor-actuatable wheel brake.

5. The brake system as claimed in claim 4, further comprising an electric energy source configured to supply energy to the first electronic control unit and the second electronic control unit.

6. The brake system as claimed in claim 5, wherein the electric energy source comprises:
    a first electric energy source configured to configured to supply energy to the first electronic control unit; and
    a second electric energy source configured to supply energy to the second electronic control unit, the second electric energy source independent from the first electric energy source.

7. The brake system as claimed in claim 1, further comprising:
    an electrically actuatable pressure-providing device; and an activation valve hydraulically coupled between the third hydraulically actuatable wheel brake, the fourth hydraulically actuatable wheel brake, and the electrically actuatable pressure-providing device, wherein the electronic control unit is configured to actuate the isolating valve and the activation valve to hydraulically decouple the third hydraulically actuatable wheel brake and the master brake cylinder and actuate the isolating valve and the activation valve to hydraulically decouple the fourth hydraulically actuatable wheel brake and the master brake cylinder in a hydraulic fallback operating mode.

* * * * *